(12) United States Patent
Toyoshima et al.

(10) Patent No.: US 6,859,719 B2
(45) Date of Patent: Feb. 22, 2005

(54) CONTROL SYSTEM AND CONTROL METHOD FOR CONTROLLING HEATER, AND ENGINE CONTROL UNIT

(75) Inventors: Hirokazu Toyoshima, Saitama-ken (JP); Tatsuhito Esaki, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/805,277

(22) Filed: Mar. 22, 2004

(65) Prior Publication Data

US 2004/0176904 A1 Sep. 9, 2004

(30) Foreign Application Priority Data

Apr. 3, 2003 (JP) ........................................ 2003-100741

(51) Int. Cl.[7] ........................ F02D 41/14; G01N 24/409
(52) U.S. Cl. ........................................ 701/113; 123/697
(58) Field of Search ............................... 701/113, 114, 701/115; 73/23.32, 117.3; 123/697, 688, 703

(56) References Cited

U.S. PATENT DOCUMENTS

| | | | | |
|---|---|---|---|---|
| 4,332,225 A | * | 6/1982 | Cox et al. | ................... 123/697 |
| 4,563,991 A | * | 1/1986 | Akatsuka et al. | ........... 123/697 |
| 5,340,462 A | * | 8/1994 | Suzuki | ........................ 123/697 |

* cited by examiner

*Primary Examiner*—Hieu T. Vo
(74) *Attorney, Agent, or Firm*—Arent Fox, PLLC.

(57) ABSTRACT

A control system capable of controlling a heater that heats an oxygen concentration detector in a fine-grained, efficient, and optimal manner. The control system controls an O2 heater for heating an O2 sensor provided in an exhaust pipe of an internal combustion engine, when the engine is started. An ECU sets a duty ratio of a control signal supplied to the O2 heater to a first predetermined value until a first predetermined time period has elapsed after the start of the engine was detected, and sets the same to a second predetermined value smaller than the first predetermined value until a second predetermined time period has elapsed after the lapse of the first predetermined value. Further, the ECU sets the duty ratio of the control signal to a third predetermined value smaller than the second predetermined value after the lapse of the second predetermined time period.

9 Claims, 6 Drawing Sheets

F I G. 1
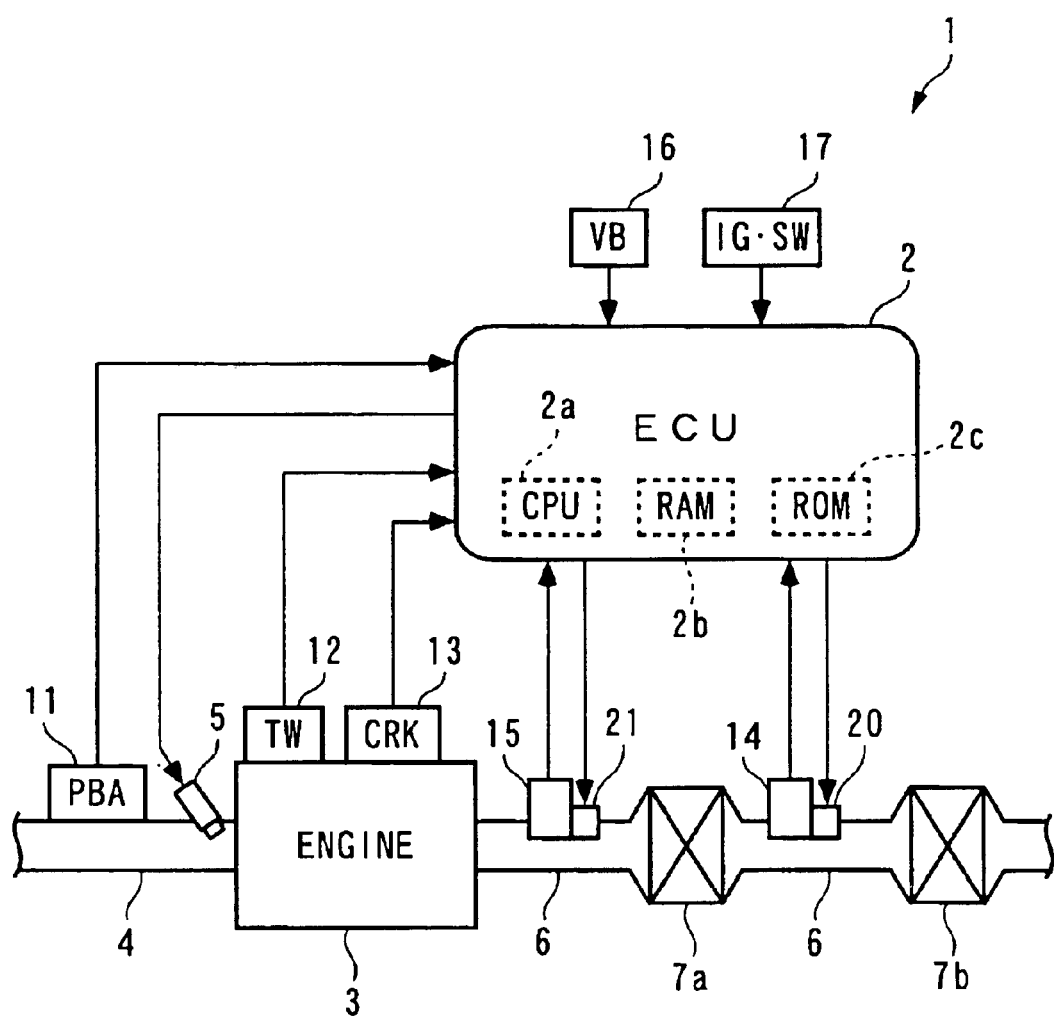

CONTROL SYSTEM AND CONTROL METHOD FOR CONTROLLING HEATER, AND ENGINE CONTROL UNIT

BACKGROUND OF THE INVENTION

1. Field of the Invention

The present invention relates to a control system and control method for controlling a heater that heats and activates an oxygen concentration detector provided in an exhaust passage of an internal combustion engine when the engine is started, as well as an engine control unit.

2. Description of the Related Art

Conventionally, a control system of the above-mentioned kind has been disclosed e.g. in Japanese Laid-Open Patent Publication (Kokai) No. H11-218044. In the control system, during the start of an internal combustion engine, a heater for heating an oxygen concentration sensor as an oxygen concentration detector is duty-controlled in two stages as described hereinbelow. More specifically, the duty ratio of a control signal to be inputted to the heater is held at a maximum value (100%) until a predetermined time period has elapsed after turn-on of an ignition switch (hereinafter referred to as "the IG·SW"). The reason for this is that the oxygen concentration sensor is required to be heated up to an activation temperature as quickly as possible so as to prevent exhaust emissions from being increased since proper air-fuel ratio control based on a detection signal from the oxygen concentration sensor cannot be executed before full activation of the oxygen concentration sensor.

Then, after the lapse of the predetermined time period after the turn-on of the IG·SW, the duty ratio of the control signal to be delivered to the heater is determined through calculation of a basic value by retrieval from a map according to the rotational speed of the engine (hereafter referred to as "the engine speed") and load on the engine, and correction of the basic value by a correction coefficient retrieved from a table according to a time period elapsed after the turn-on of the IG·SW. A correction executing time period over which the above-mentioned correction is performed, i.e. part of an energization time period for energizing the heater, over which the above-mentioned correction is performed, is set by searching a table according to the engine coolant temperature of the engine detected by an engine coolant temperature sensor when the IG·SW is turned on. The correction coefficient and the correction executing time period are thus set by estimating the temperature of the oxygen concentration sensor at the time when the IG·SW is turned on, and setting the duty ratio of the control signal and the energization time period for the heater according to the estimated temperature, so as to prevent the service life of the oxygen concentration sensor from becoming short due to overheating thereof by the heater.

In the conventional control system described above, the duty ratio of the control signal to the heater is controlled only in two stages, and the heater is controlled to the maximum duty ratio, regardless of the actual temperature of the oxygen concentration sensor, until the predetermined time period elapses after the turn-on of the IG·SW. Therefore, the control accuracy is low. For example, even when a stoppage time period of the engine before the present start was short and the oxygen concentration sensor has already reached the activation temperature, the heater is controlled to the maximum duty ratio, so that battery power is wastefully used and the service life of the sensor can be reduced due to overheat. Further, the oxygen concentration sensor is disposed at a location remote from the engine coolant temperature sensor that detects the coolant temperature of the engine, and the temperature-related properties, such as specific heat, of the oxygen concentration sensor are different from those of coolant for the engine, so that after turn-off of the IG·SW, the actual temperature of the oxygen concentration sensor changes differently from the engine coolant temperature. For this reason, the engine coolant temperature at the restart of the engine after the turn-off of the IG·SW does not accurately reflect the actual state of the temperature of the oxygen concentration sensor. Therefore, if the heater is controlled according to the coolant temperature, the control accuracy becomes low. For example, after the restart of the engine, the oxygen concentration sensor whose temperature has already reached the activation temperature, as in the above-mentioned case, can be overheated by the heater.

SUMMARY OF THE INVENTION

It is an object of the present invention to provide a control system, a control method, and an engine control unit which are capable of controlling a heater that heats an oxygen concentration detector in a fine-grained, efficient, and optimal manner.

To attain the above object, in a first aspect of the present invention, there is provided a control system for controlling a heater that heats an oxygen concentration detector provided in an exhaust passage of an internal combustion engine, when the engine is started, the control system comprising:

detection means for detecting a start and a stop of the engine; and control means for controlling the heater by delivering a control signal to the heater, and wherein the control means comprises:

first setting means for setting a value of the control signal to a first predetermined value until a first predetermined time period has elapsed after the start of the engine was detected by the detection means, second setting means for setting the value of the control signal to a second predetermined value smaller than the first predetermined value until a second predetermined time period has elapsed after the lapse of the first predetermined value, and third setting means for setting the value of the control signal to a third predetermined value smaller than the second predetermined value after the lapse of the second predetermined time period.

With the arrangement of this control system for controlling a heater, the value of the control signal to be supplied to the heater by the control means is set to the first predetermined value until the first predetermined time period has elapsed after the start of the engine was detected, and to the second predetermined value smaller than the first predetermined value until the second predetermined time period has elapsed after the lapse of the first predetermined value. Further, the value of the control signal is set to the third predetermined value smaller than the second predetermined value after the lapse of the second predetermined time period. Thus, the value of the control signal to the heater is set such that it is progressively reduced in at least three stages, so that the heater for heating the oxygen concentration detector can be controlled in a more fine-grained manner than it conventionally was.

Preferably, the control means further comprises stoppage time period-measuring means for measuring a time period elapsed after the stop of the engine, and first predetermined time period-setting means for setting the first predetermined time period according to the elapsed time period measured by the stoppage time period-measuring means at the start of the engine.

With the arrangement of this preferred embodiment, the first predetermined time period immediately after the start of the engine, i.e. a control time period over which the heater is controlled by the maximum value of the control signal is set according to the elapsed time period measured by the stoppage time period-measuring means, i.e. the stoppage time period of the engine before the present start. In this case, since a stoppage time period before the start of the engine appropriately reflects an actual change in the temperature of the oxygen concentration detector, it is possible to set the first predetermined time period to a just appropriate and optimal time period while causing the actual change in the temperature of the oxygen concentration detector to be reflected therein. For example, when the stoppage time period of the engine is short so that the temperature of the oxygen concentration detector has hardly been lowered, the control time period, i.e. operation time period of the heater can be set to a shorter time period according to the short stoppage time period. This makes it possible to control the heater more efficiently and optimally than the conventional method in which the operation time period of the heater is set to a predetermined time period which is fixed (or set according to the engine coolant temperature that changes in a different manner from the actual temperature of the oxygen concentration detector), which contributes to reduced power consumption and prolonged service life of the heater.

Preferably, the control means further comprises stoppage time period-measuring means for measuring a time period elapsed after the stop of the engine, supply time period-measuring means for measuring a supply time period over which the control signal has been supplied to the heater after the start of the engine, and first predetermined time period-setting means for setting the first predetermined time period at a present start of the engine, according to the supply time period measured by the supply time period-measuring means during an immediately preceding start of the engine, and the elapsed time period measured by the stoppage time period-measuring means before the present start of the engine.

With this arrangement of this preferred embodiment, the first predetermined time period at the present start of the engine is set according to the supply time period measured during the immediately preceding start of the engine, and the elapsed time period measured before the present start of the engine. Since the stoppage time period before the start of the engine appropriately reflects an actual change in the temperature of the oxygen concentration detector, as described hereinbefore, and the supply time period measured during the immediately preceding start of the engine appropriately reflects the amount of heat supplied to the oxygen concentration detector from the heater during the start of the engine, i.e. the state of the temperature of the oxygen concentration detector, it is possible to set the first predetermined time period efficiently and optimally while causing the state of the temperature of the oxygen concentration detector before the stop of the engine and the change in the temperature of the oxygen concentration detector after the stop of the engine to be reflected therein. This makes it possible to control the heater more efficiently and optimally than the conventional method in which the operation time period of the heater is set to a predetermined time period which is fixed (or set according to the engine coolant temperature that changes in a different manner from the actual temperature of the oxygen concentration detector), which contributes to reduced power consumption and prolonged service life of the heater.

To attain the above object, in a second aspect of the present invention, there is provided a method of controlling a heater that heats an oxygen concentration detector provided in an exhaust passage of an internal combustion engine, when the engine is started, the method comprising the steps of:

detecting a start and a stop of the engine; and controlling the heater by delivering a control signal to the heater, and wherein the controlling step comprises the steps of:

setting a value of the control signal to a first predetermined value until a first predetermined time period has elapsed after the start of the engine was detected in the detecting step, setting the value of the control signal to a second predetermined value smaller than the first predetermined value until a second predetermined time period has elapsed after the lapse of the first predetermined value, and setting the value of the control signal to a third predetermined value smaller than the second predetermined value after the lapse of the second predetermined time period.

Preferably, the controlling step further comprises the steps of measuring a time period elapsed after the stop of the engine, and setting the first predetermined time period according to the elapsed time period measured in the step of measuring the stoppage time period at the start of the engine.

Preferably, the controlling step further comprises the steps of measuring a time period elapsed after the stop of the engine, measuring a supply time period over which the control signal has been supplied to the heater after the start of the engine, and setting the first predetermined time period at a present start of the engine, according to the supply time period measured in the step of measuring the supply time period during an immediately preceding start of the engine, and the elapsed time period measured in the step of measuring the stoppage time period at the present start of the engine.

To attain the above object, in a third aspect of the present invention, there is provided an engine control unit including a control program for causing a computer to control a heater that heats an oxygen concentration detector provided in an exhaust passage of an internal combustion engine, when the engine is started, wherein the control program causes the computer to detect start and stoppage of the engine, and control the heater by delivering a control signal to the heater, and wherein when the control program causes the computer to control the heater, the control program causes the computer to set a value of the control signal to a first predetermined value until a first predetermined time period has elapsed after the start of the engine was detected, set the value of the control signal to a second predetermined value smaller than the first predetermined value until a second predetermined time period has elapsed after the lapse of the first predetermined value, and set the value of the control signal to a third predetermined value smaller than the second predetermined value after the lapse of the second predetermined time period.

Preferably, when the control program causes the computer to control the heater, the control program causes the computer to measure a time period elapsed after the stop of the engine, and set the first predetermined time period according to the elapsed time period at the start of the engine.

Preferably, when the control program causes the computer to control the heater, the control program causes the computer to measure a time period elapsed after the stop of the engine, measure a supply time period over which the control signal has been supplied to the heater after the start of the engine, and set the first predetermined time period at a present start of the engine, according to the supply time period measured during an immediately preceding start of the engine, and the elapsed time period measured at the present start of the engine.

The above and other objects, features, and advantages of the invention will become more apparent from the following detailed description taken in conjunction with the accompanying drawings.

BRIEF DESCRIPTION OF THE DRAWINGS

FIG. 1 is a diagram schematically showing the arrangement of a control system according to an embodiment of the present invention and an internal combustion engine provided with an oxygen concentration detector including a heater to which the control system is applied;

FIGS. 6A to 6C are timing charts showing examples of operation carried out during a start of the engine, in which:

FIG. 6A shows an example of operation carried out when the temperature of the O2 sensor is in a low temperature range at the start of the engine;

FIG. 6B shows an example of operation carried out when the temperature of the O2 sensor is in an intermediate temperature range; and FIG. 6C shows an example of operation carried out when the temperature of the O2 sensor is in a high temperature range.

DETAILED DESCRIPTION OF THE PREFERRED EMBODIMENTS

Figure 2:
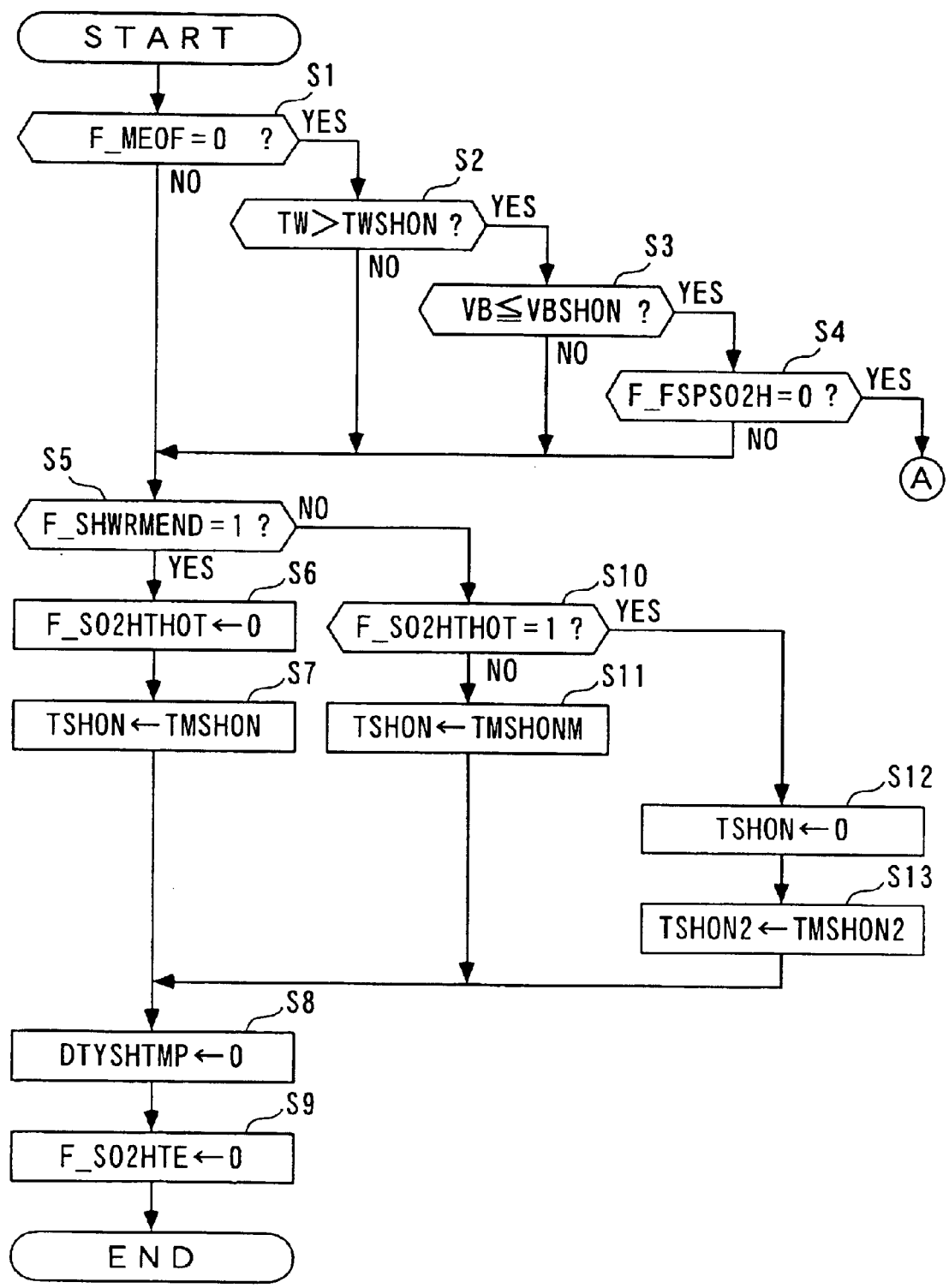
FIG. 2 is a flowchart of a program for executing duty control of the O2 heater.

The present invention will now be described in detail with reference to the drawings showing an embodiment thereof. FIG. 1 schematically shows the arrangement of a control system according to an embodiment of the invention and an internal combustion engine provided with an oxygen concentration detector including a heater to which the control system is applied. As shown in FIG. 1, the control system 1 includes an ECU 2, which executes duty control of heaters 20 and 21, as described hereinafter.

The internal combustion engine (hereinafter simply referred to as "the engine") 3 is a gasoline engine installed on a vehicle, not shown. The engine 3 has an intake pipe 4 having an intake pipe absolute pressure sensor 11 inserted therein at a location downstream of a throttle valve, not shown. The intake pipe absolute pressure sensor 11 is implemented e.g. by a semiconductor pressure sensor, which detects an intake pipe absolute pressure PBA within the intake pipe 4 and delivers an electric signal indicative of the sensed intake pipe absolute pressure PBA to the ECU 2.

Further, the intake pipe 4 has injectors 5, only one of which is shown, inserted therein at a location downstream of the intake pipe absolute pressure sensor 11. Each injector 5 is controlled as to a fuel injection amount defined by a time period over which the injector 5 is open, and fuel injection timing, by a control signal delivered from the ECU 2 during operation of the engine 3.

An engine coolant temperature sensor 12 formed e.g. by a thermistor is mounted in the cylinder block of the engine 3. The engine coolant temperature sensor 12 senses an engine coolant temperature TW which is the temperature of an engine coolant circulating through the cylinder block of the engine 3, and delivers a signal indicative of the sensed engine coolant temperature TW to the ECU 2.

A crank angle position sensor 13 (detection means) is provided for a crankshaft (not shown) of the engine 3, for delivering a CRK signal, which is a pulse signal, to the ECU 2 in accordance with rotation of the crankshaft. Each pulse of the CRK signal is generated whenever the crankshaft rotates through a predetermined angle (e.g. 30 degrees). The ECU 2 determines a rotational speed (hereinafter referred to as "the engine speed") NE of the engine 3, based on the CRK signal.

Further, a first catalytic device 7a and a second catalytic devices 7b are arranged in the exhaust pipe 6 (exhaust passage) of the engine 3 from up stream to downstream in the mentioned order in a spaced relationship. Each of the catalytic devices 7a and 7b is a combination of a NOx catalyst and a three-way catalyst.

An oxygen concentration sensor (hereinafter referred to as "the O2 sensor") 14 as an oxygen concentration detector is inserted into the exhaust pipe 6 between the first and second catalytic devices 7a and 7b. The O2 sensor 14 is comprised of a zirconia layer and platinum electrodes, and delivers to the ECU 2 an electric signal dependent on the concentration of oxygen contained in exhaust gases downstream of the first catalytic device 7a. The electric signal assumes a high-level voltage value (e.g. 0.8 V) when an air-fuel mixture having a richer air-fuel ratio than the stoichiometric air-fuel ratio has been burned, whereas it assumes a low-level voltage value (e.g. 0.2 V) when an air-fuel mixture having a leaner air-fuel ratio than the stoichiometric air-fuel ratio has been burned.

The O2 sensor 14 has an O2 heater 20 (heater). The O2 heater 20 is used to activate the sensor element of the O2 sensor 14 quickly at the start of the engine 3, and the amount of heat to be generated by the O2 heater is controlled by duty control by the ECU 2 as described in detail hereinafter.

A LAF sensor 15 as an oxygen concentration detector is disposed in the exhaust pipe 6 at a location upstream of the first catalytic device 7a. The LAF sensor 15 is a combination of a sensor similar to the O2 sensor 14 and a detection circuit, such as a linearizer, and detects the concentration of oxygen contained in exhaust gases linearly over a wide range of the air-fuel ratio ranging from a rich region to a lean region, thereby delivering an output proportional to the sensed oxygen concentration to the ECU 2. The ECU 2 determines a control signal to be delivered to the injectors 5, based on the output from the O2 sensor 14 and the LAF sensor 15, thereby performing the air-fuel ratio control for the engine 3.

The LAF sensor 15 has a LAF heater 21 (heater). Similarly to the O2 heater 20, the LAF heater 21 is used to activate the sensor element of the LAF sensor 15 quickly at the start of the engine 3, and the amount of heat to be generated by the LAF heater 21 is controlled by duty control by the ECU 2.

A battery voltage sensor 16 and an ignition switch (hereinafter referred to as "the IG·SW") 17 are connected to the ECU 2. The battery voltage sensor 16 detects a battery voltage VB of a battery, not shown, to deliver a signal indicative of the sensed battery voltage VB to the ECU 2. On the other hand, the IG·SW 17 (detection means) is turned on and off by operation of an ignition key (not shown), and delivers a signal indicative of its own ON/OFF state to the ECU 2.

The ECU 2 is implemented by a microcomputer including an input/output interface, not shown, a CPU 2a, a RAM 2b, and a ROM 2c. The RAM 2b is supplied with power by a backup power source such that data stored therein can be preserved even during stoppage of the engine 3. It should be noted that in the present embodiment, detection means, control means, first to third setting means, stoppage time period-measuring means, first predetermined time period-setting means, and supply time period-measuring means are formed by the ECU 2.

When the engine 3 starts, the ECU 2 carries out duty control of the O2 heater 20 and the LAF heater 21 based on the detection signals from the sensors 11 to 16 and the signal from the switch 17 so as to activate the O2 sensor 14 and the LAF sensor 15, as described in detail hereinafter.

The O2 heater 20 and the LAF heater 21 are duty-controlled similarly to each other, and hence the duty control of the O2 heater 20 will be described by way of example with reference to FIGS. 2 and 3. The program is executed at intervals of a predetermined time period (e.g. 10 milliseconds) in the ON state of the IG·SW 17, and repeatedly executed even after turn-off of the IG·SW 17 until a predetermined time (e.g. 600 seconds) has elapsed.

In the program, first, it is determined in a step 1 (in FIG. 1, simplified to "S1"; the following steps are also shown in a simplified manner) to a step 4 whether or not conditions for executing the duty control are satisfied. More specifically, in the steps 1 to 4, when the following four conditions (a) to (d) are all satisfied, it is determined that the conditions for executing the duty control are satisfied. Otherwise, it is determined that the conditions for executing the duty control are not satisfied:

(a) An engine stop flag F_MEOF is equal to 0.

(b) The engine coolant temperature TW is higher than a predetermined value TWSHON (e.g. 5° C.).

(c) The battery voltage VB is equal to or lower than a predetermined value VBSHON (e.g. 16 V).

(d) The failure flag F_FSPSO2H is equal to 0.

It should be noted that the engine stop flag F_MEOF is set to 1 when it is determined, in a determination process (not shown) executed based on the engine speed NE and the ON/OFF state of the IG·SW 17, that the engine 3 is in stoppage, and set to 0 when it is determined in the determination process that the engine 3 is in operation. On the other hand, the failure flag F_FSPSO2H is set to 1 when the O2 sensor 14 and/or the O2 heater 20 are/is faulty, and otherwise, set to 0.

If in the steps 1 to 4, at least one of the conditions (a) to (d) is not satisfied, i.e. if the engine is in stoppage, the engine coolant temperature TW is low, the battery voltage VB is fairly high, or the O2 sensor 14 and/or the O2 heater 20 are/is faulty, it is judged that the conditions for executing the duty control are not satisfied, and the program proceeds to a step 5, wherein it is determined whether or not a stoppage time lapse flag F_SHWRMEND is equal to 1.

Figure 4:
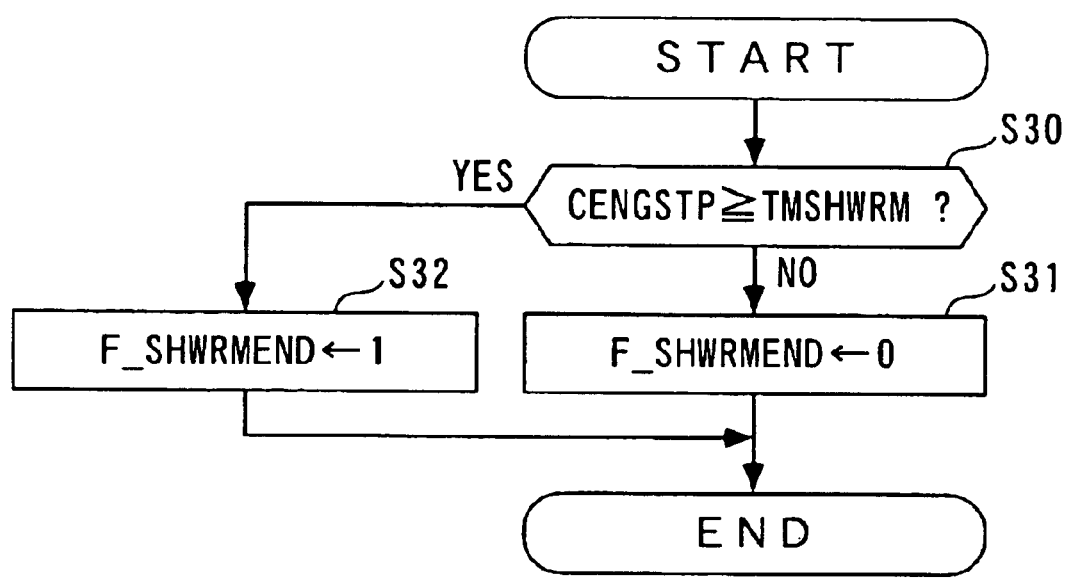
FIG. 4 is a flowchart of a program for setting a stop page time lapse flag.

The stoppage time lapse flag F_SHWRMEND is set in a program shown in FIG. 4. This program is executed at intervals of a predetermined time period (e.g. 100 milliseconds) until a predetermined time period (e.g. 600 seconds) elapses after stoppage of the engine 3 by turn-off of the IG·SW 17.

As shown in FIG. 4, in the present program, it is determined in a step 30 whether or not a count CENGSTP of an up-counter for counting a time period elapsed after the stop of the engine is equal to or larger than a predetermined value MSHWRM (e.g. 48000). It should be noted that the up-counter is a program counter. If the answer to the question is negative (NO), i.e. if a time period corresponding to the predetermined value TMSHWRM has not elapsed after the stop of the engine, the stoppage time lapse flag F_SHWRMEND is set to 0 (step 31). On the other hand, if the answer to the question of the step 30 is affirmative (YES), i.e. if the time period corresponding to the predetermined value TMSHWRM has elapsed after the stop of the engine, the stoppage time lapse flag F_SHWRMEND is set to 1 (step 32). It should be noted that the value of the stoppage time lapse flag F_SHWRMEND is stored in the RAM 2b.

Referring again to FIG. 2, if the answer to the question of the step 5 is affirmative (YES), i.e. if the time period corresponding to the predetermined value TMSHWRM has elapsed after the stop of the engine, it is judged that the temperature of the O2 sensor 14 has fallen to a low temperature range considerably lower than the activation temperature, and the program proceeds to a step 6, wherein a high sensor temperature flag F_SO2HTHOT is set to 0 to indicate the fact that the temperature of the O2 sensor 14 has thus fallen.

Then, the program proceeds to a step 7, wherein a timer value TSHON of a first timer of a downcount type is set to a predetermined value TMSHON (e.g. 20 seconds). The first timer is a program timer that counts a time period over which a control signal is supplied to the O2 heater 20, i.e. a time period over which the O2 heater 20 is operated.

Thereafter, the program proceeds to a step 8, wherein a duty ratio DTYSHTMP of the control signal to the O2 heater 20 is set to 0. Then, in a step 9, a control execution flag F_SO2HTE is set to 0 to indicate that the conditions for executing the duty control are not satisfied, followed by terminating the present program.

On the other hand, if the answer to the question of the step 5 is negative (NO), i.e. if the predetermined time period corresponding to the predetermined value TMSHWRM has not elapsed after the stop of the engine, the program proceeds to a step 10, wherein it is determined whether or not the high sensor temperature flag F_SO2HTHOT is equal to 1.

If the answer to this question is negative (NO), and hence it is presumed that the temperature of the O2 sensor 14 is lower than the activation temperature, but that it is in an intermediate temperature range higher than the aforementioned low temperature range, the program proceeds to a step 11, wherein the timer value TSHON of the first timer is set to a predetermined value TMSHONM (e.g. 10 seconds) smaller than the predetermined value TMSHON. Then, the steps 8 and 9 are executed, followed by terminating the present program.

On the other hand, if the answer to the question of the step 10 is affirmative (YES), i.e. if the temperature of the O2 sensor 14 is in a high temperature range which is lower than the activation temperature but higher than the intermediate temperature range, the timer value TSHON of the first timer is set to 0 in a step 12, and then, a timer value TSHON2 of a second timer is set to a predetermined value TMSHON2

(e.g. 210 seconds) in a step 13. Similarly to the first timer, the second timer is a program timer that counts a time period over which the control signal is supplied to the O2 heater 20. Then, the steps 8 and 9 are executed, followed by terminating the present program.

Figure 3:
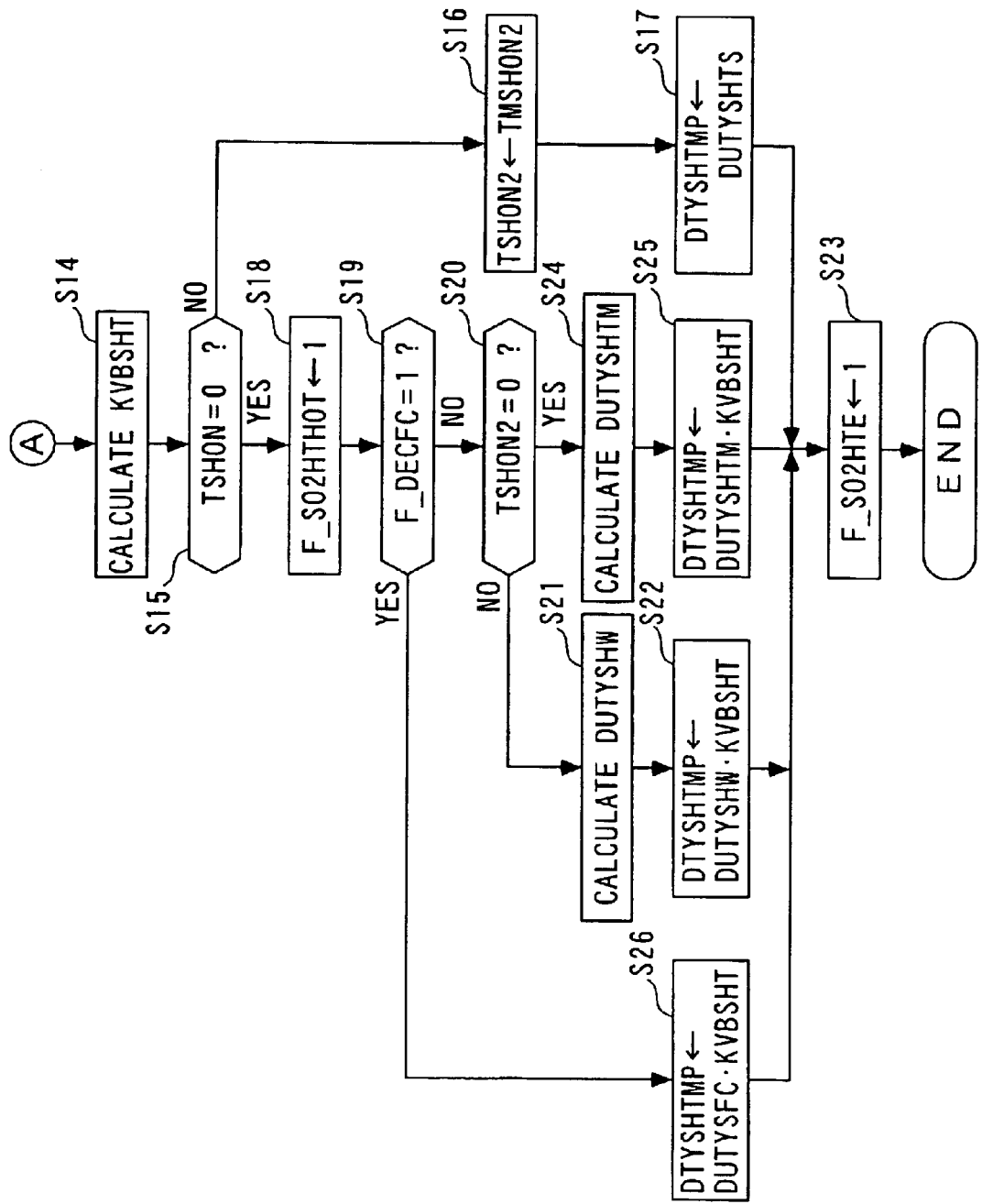
FIG. 3 is a continuation of the FIG. 2 flowchart.
Figure 5:
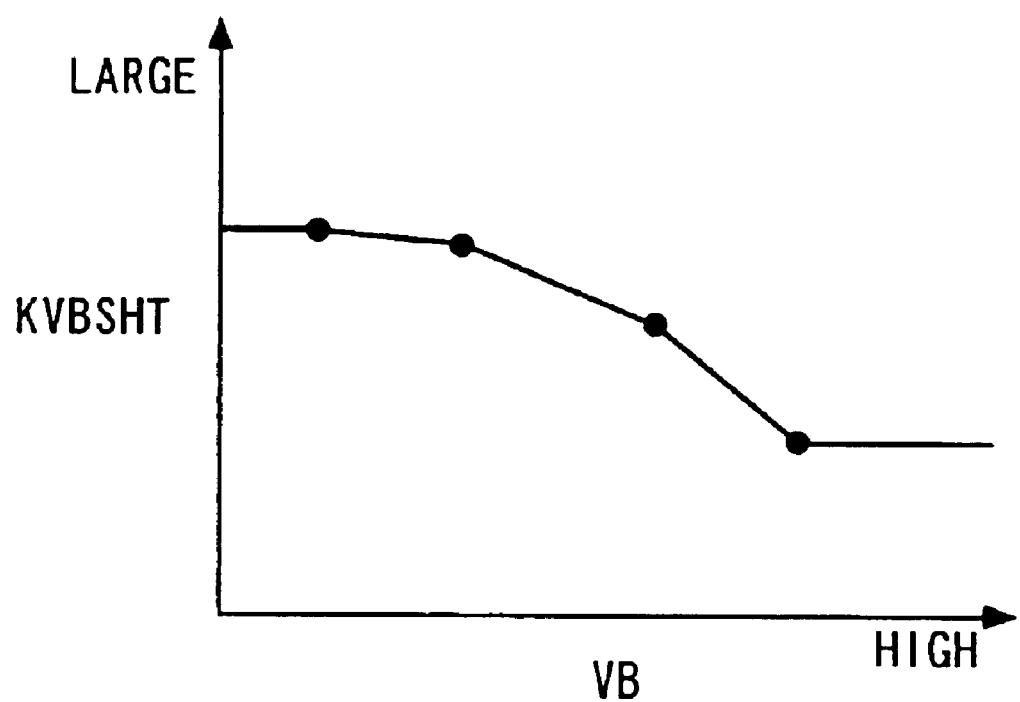
FIG. 5 is a diagram showing an example of a table for use in calculation of a correction coefficient.

On the other hand, when the four conditions (a) to (d) are all satisfied in the steps 1 to 4, it is judged that the conditions for executing the duty control are satisfied, so that the program proceeds to a step 14 in FIG. 3, wherein a correction coefficient KVBSHT is calculated by searching a table shown in FIG. 5 according to the battery voltage VB. In this table, the correction coefficient KVBSHT is set to a smaller value as the battery voltage VB becomes higher. This is because the temperature of the O2 heater 20 rises at a higher rate as the battery voltage VB is higher.

Then, the program proceeds to a step 15, wherein it is determined whether or not the timer value TSHON of the first timer is equal to 0. If the answer to the question is negative (NO), the program proceeds to a step 16, wherein the timer value TSHON2 of the second timer is set to the predetermined value TMSHON2.

Then, in a step 17, the duty ratio DTYSHTMP of the control signal to the O2 heater 20 is set to a predetermined value DUTYSHTS (e.g. 100%, first predetermined value), and in a step 23, the control execution flag F_SO2HTE is set to 1 to indicate that the conditions for executing the duty control are satisfied. Thus, the control signal with the duty ratio DTYSHTMP set in the step 17 is supplied to the O2 heater 20, followed by terminating the program.

On the other hand, if the answer to the question of the step 15 is affirmative (YES), i.e. if the timer value TSHON is equal to 0, it is judged that the temperature of the O2 sensor 14 is in the high temperature range, so that the program proceeds to a step 18, wherein the high sensor temperature flag F_SO2HTHOT is set to 1 to indicate that the temperature of the O2 sensor 14 is in the high temperature range.

Then, the program proceeds to a step 19, wherein it is determined whether or not a deceleration fuel cut-off operation flag F_DECFC is equal to 1. The deceleration fuel cut-off operation flag F_DECFC is set to 1 when the engine is performing fuel cut-off operation for deceleration, and set to 0 when the engine 3 is not performing the fuel cut-off operation for deceleration. If the answer to the question is negative (NO), i.e. if the engine 3 is not performing the fuel cut-off operation for deceleration, the program proceeds to a step 20, wherein it is determined whether or not the timer value TSHON2 of the second timer is equal to 0.

If the answer to the question is negative (NO), the program proceeds to a step 21, wherein a first basic value DUTYSHW of the duty ratio is calculated by searching a map, not shown, according to the engine speed NE and the intake pipe absolute pressure PBA. Thereafter, the program proceeds to a step 22, wherein the duty ratio DTYSHTMP of the control signal is set to the product DUTYSHW·KVBSHT of the first basic value DUTYSHW and the correction coefficient KVBSHT. Then, the step S23 is executed, followed by terminating the program. It should be noted that the product DUTYSHW·KVBSHT (second predetermined value) is configured such that it becomes smaller than the predetermined value DUTYSHTS.

On the other hand, if the answer to the question of the step 20 is affirmative (YES), i.e. if the timer value TSHON2 is equal to 0, the program proceeds to a step 24, wherein a second basic value DUTYSHTM of the duty ratio is calculated by searching a map, not shown, according to the engine speed NE and the intake pipe absolute pressure PBA.

Thereafter, the program proceeds to a step 25, wherein the duty ratio DTYSHTMP of the control signal is set to the product DUTYSHTM·KVBSHT of the second basic value DUTYSHTM and the correction coefficient KVBSHT. Then, the step 23 is executed, followed by terminating the program. It should be noted that the product DUTYSHTM·KVBSHT (third predetermined value) is configured such that it becomes smaller than the product DUSTYSHW·KVBSHT.

On the other hand, if the answer to the question of the step 19 is affirmative (YES), i.e. if the engine 3 is performing the fuel cut-off operation for deceleration, the program proceeds to a step 26, wherein the duty ratio DTYSHTMP of the control signal is set to the product DUTYSFC·KVBSHT of a predetermined value DUTYSFC for fuel cut-off operation for deceleration and the correction coefficient KVBSHT. Then, the step 23 is executed, followed by terminating the program.

Figure 6A:
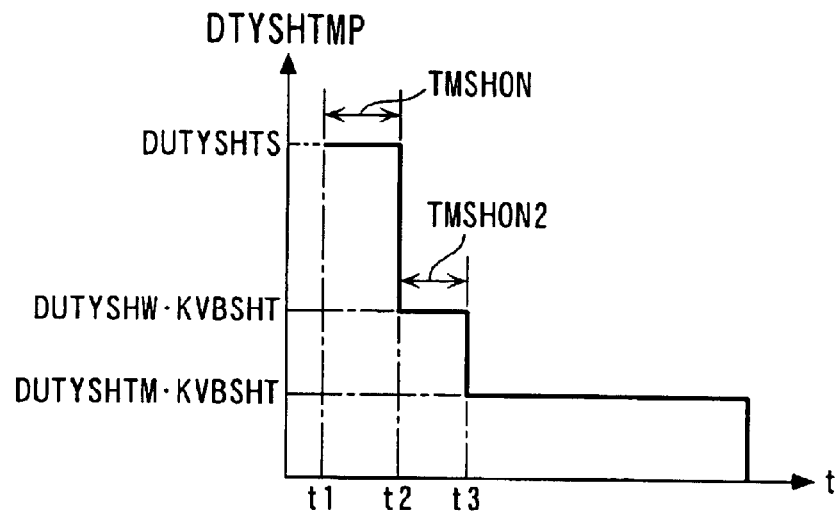

Next, examples of operation of the control system in which the duty control of the O2 heater 20 is performed in the case of the engine 3 not performing fuel cut-off operation for deceleration will be described with reference to FIGS. 6A to 6C. FIG. 6A shows an example of operation the control system carried out when the temperature of the O2 sensor 14 is in the low temperature range at the start of the engine 3, FIG. 6B shows an example of operation of the same carried out when the temperature of the O2 sensor 14 is in the intermediate temperature range at the start of the engine 3, and FIG. 6C shows an example of operation of the same carried out when the temperature of the O2 sensor 14 is in the high temperature range at the start of the engine 3.

When the temperature of the O2 sensor 14 is in the low temperature range at the start of the engine 3 (YES to step 5), the duty ratio DTYSHTMP of the control signal to the O2 heater 20 is held at the predetermined value DUTYSHTS, as shown in FIG. 6A, during a time period (TMSHON: first predetermined period) between the start of the engine 3 (time t1) and a time point when the timer value TSHON of the first timer becomes equal to 0 (step 17). Then, the duty ratio DTYSHTMP is held at the product DUTYSHW·KVBSHT during a time period (TMSHON2: second predetermined period) between the time point (time t2) when TSHON becomes equal to 0 and a time point when the timer value TSHON2 of the second timer becomes equal to 0. Further, after the time point (time t3) when TSHON2 becomes equal to 0, the duty ratio DTYSHTMP is held at the product DUTYSHTM·KVBSHT. It should be noted that e.g. in a case where the engine 3 is restarted immediately after the engine 3 was stopped between the time t1 and the time t2 during execution of the control operation shown in FIG. 6A, the temperature value of the O2 sensor 14 is in the intermediate temperature range, and in such a case, control operation shown FIG. 6B is executed as below.

Figure 6B:
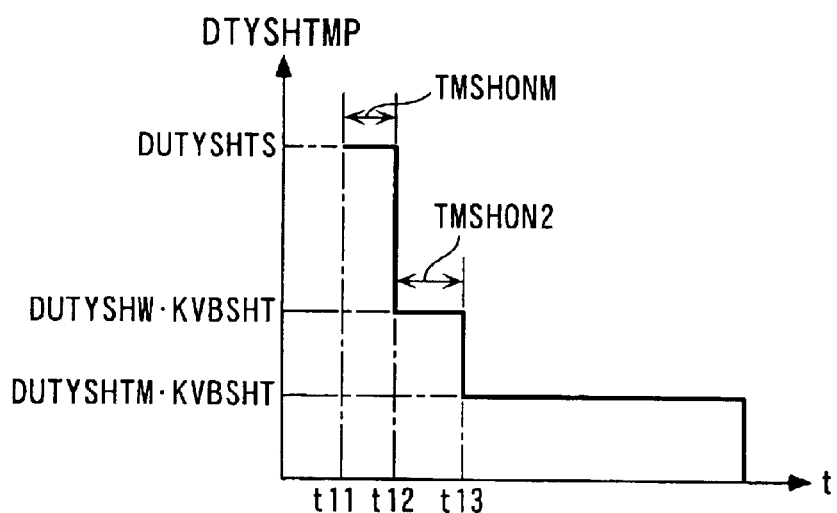
Figure 6C:
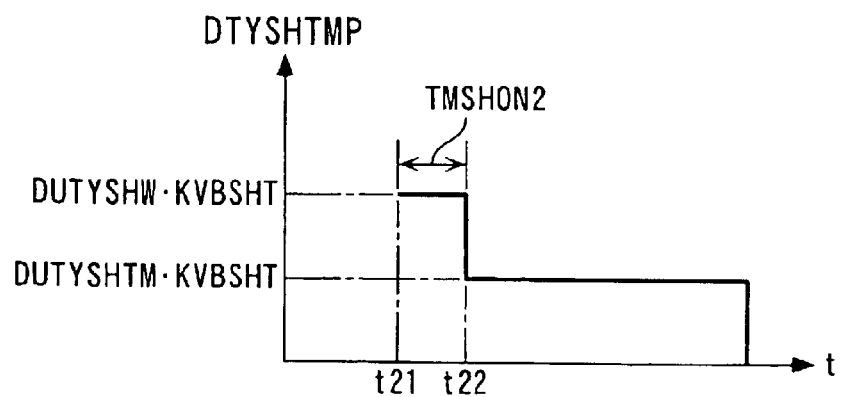

More specifically, when the temperature of the O2 sensor 14 is in the intermediate temperature range at the start of the engine 3 (NO to step 10), the duty ratio DTYSHTMP is held at the predetermined value DUTYSHTS, as shown in FIG. 6B, during a time period (TMSHONM: first predetermined period) between a time point (time t11) when the engine 3 is started and a time point when the timer value TSHON of the first timer becomes equal to 0. Then, during a time period (TMSHON2: second predetermined period) between the time point (time t12) when TSHON becomes equal to 0 and a time point when the timer value TSHON2 of the second timer becomes equal to 0 and after the time point (time t13) when TSHON2 becomes equal to 0, the duty ratio DTYSHTMP is held in the same manner as in the example shown in FIG. 6A. It should be noted that e.g. in a case where the engine 3 is restarted immediately after the engine 3 was stopped between the time t11 and the time t12 during execution of the control operation shown in FIG. 6B, as well, the temperature value of the O2 sensor 14 at the restart of the engine 3 is also in the intermediate temperature range, and hence the control operation described above is executed.

Further, e.g. in cases where the engine 3 is restarted immediately after the engine 3 was stopped after the time t2 during execution of the control operation shown in FIG. 6A, or immediately after the engine 3 was stopped after the time t12 during execution of the control operation shown in FIG. 6B, the temperature value of the O2 sensor 14 is in the high temperature range at the restart of the engine (YES to step 10). In this case, since the timer value TSHON of the first timer is set to 0 (step 12), the duty ratio DTYSHTMP is held at the product DUTYSHW·KVBSHT, as shown in FIG. 6C, during a time period (TMSHON2: second predetermined time period) between a time point (time t21) when the engine 3 is started and a time point when the timer value TSHON2 of the second timer becomes equal to 0, and then set to the product DUTYSHTM·KVBSHT after the time point (time t22) when TSHON2 becomes equal to 0. It should be noted that when the engine 3 is stopped (interrupted) after the time t21 during execution of the control operation shown in FIG. 6C, the temperature value of the O2 sensor 14 is also in the high temperature range at the restart of the engine, and hence the control operation described above is executed.

As described above, according to the control system 1 of the present embodiment, when the temperature of the O2 sensor 14 is either in the low temperature range or in the intermediate temperature range at the start of the engine, the duty ratio DTYSHTMP of the control signal is set to values reduced in three stages (DUTYSHTS→DUTYSHW·KVBSHT→DUTYSHTM·KVBSHT), so that the O2 heater 20 for heating the O2 sensor 14 can be controlled in a more fine-grained manner than by the conventional two-stage control method.

Further, the timer value TSHON of the first timer, i.e. a value that determines the first control period for controlling the duty ratio DTYSHTMP to the maximum value (predetermined value DUTYSHTS) is set according to the stoppage time period of the engine 3 before the present start of the same and the execution time period of heater control during the immediately preceding start of the engine 3. More specifically, when the stoppage time period of the engine 3 before the present start was long (YES to step 5), the timer value TSHON is set to the predetermined value TMSHON, and when the stoppage time period of the engine 3 before the present start and the execution time period of the heater control during the immediately preceding start were both short (NO to step 5 and NO to step 10), the timer value TSHON is set to the predetermined value TMSHONM that is smaller than the predetermined value TMSHON. Further, when the execution time period of the heater control during the immediately preceding start was long (YES to step 10), the timer value TSHON is set to 0. The stoppage time period of the engine 3 before the present start and the execution time period of the heater control during the immediately preceding start appropriately reflect an actual change in the temperature of the O2 sensor 14 before the present start. Therefore, the first control period can be set to a sufficient and optimal value reflecting an actual change in the temperature of the O2 sensor 14. This makes it possible to control the O2 heater 20 more efficiently and optimally than the conventional method wherein the heater operation time period is set to a predetermined time which is fixed (or set according to the engine coolant temperature that changes in a different manner from the actual temperature of the oxygen concentration detector), which contributes to reduced power consumption and prolonged service life of the O2 heater 20.

It should be noted that the present invention is not limited to the above described embodiment applied to the O2 heater 20 and the LAF heater 21 for heating the O2 sensor 14 and the LAF sensor 15 provided in the engine 3 on the vehicle, but it can be applied to any device for heating an oxygen concentration detector provided in an exhaust passage in an internal combustion engine.

It is further understood by those skilled in the art that the fore going are preferred embodiments of the invention, and that various changes and modifications can be made without departing from the spirit and scope thereof.

What is claimed is:

1. A control system for controlling a heater that heats an oxygen concentration detector provided in an exhaust passage of an internal combustion engine, when the engine is started, the control system comprising:

detection means for detecting a start and a stop of the engine; and control means for controlling the heater by delivering a control signal to the heater, and wherein said control means comprises:

first setting means for setting a value of the control signal to a first predetermined value until a first predetermined time period has elapsed after the start of the engine was detected by said detection means, second setting means for setting the value of the control signal to a second predetermined value smaller than the first predetermined value until a second predetermined time period has elapsed after the lapse of the first predetermined value, and third setting means for setting the value of the control signal to a third predetermined value smaller than the second predetermined value after the lapse of the second predetermined time period.

2. A control system as claimed in claim 1, wherein said control means further comprises:

stoppage time period-measuring means for measuring a time period elapsed after the stop of the engine, and first predetermined time period-setting means for setting the first predetermined time period according to the elapsed time period measured by said stoppage time period-measuring means at the start of the engine.

3. A control system as claimed in claim 1, wherein said control means further comprises:

stoppage time period-measuring means for measuring a time period elapsed after the stop of the engine, supply time period-measuring means for measuring a supply time period over which the control signal has been supplied to the heater after the start of the engine, and first predetermined time period-setting means for setting the first predetermined time period at a present start of the engine, according to the supply time period measured by said supply time period-measuring means during an immediately preceding start of the engine, and the elapsed time period measured by said stoppage time period-measuring means at the present start of the engine.

4. An engine control unit including a control program for causing a computer to control a heater that heats an oxygen concentration detector provided in an exhaust passage of an internal combustion engine, when the engine is started, wherein the control program causes the computer to detect start and stoppage of the engine, and control the heater by delivering a control signal to the heater, and wherein when the control program causes the computer to control the heater, the control program causes the computer to set a value of the control signal to a first predetermined value until a first predetermined time period has elapsed after the start of the engine was detected, set the value of the control signal to a second predetermined value smaller than the first predetermined value until a second predetermined time period has elapsed after the lapse of the first predetermined value, and set the value of the control signal to a third predetermined value smaller than the second predetermined value after the lapse of the second predetermined time period.

5. An engine control unit as claimed in claim 4, wherein when the control program causes the computer to control the heater, the control program causes the computer to measure a time period elapsed after the stop of the engine, and set the first predetermined time period according to the elapsed time period at the start of the engine.

6. An engine control unit as claimed in claim 4, wherein when the control program causes the computer to control the heater, the control program causes the computer to measure a time period elapsed after the stop of the engine, measure a supply time period over which the control signal has been supplied to the heater after the start of the engine, and set the first predetermined time period at a present start of the engine, according to the supply time period measured during an immediately preceding start of the engine, and the elapsed time period measured at the present start of the engine.

7. A method of controlling a heater that heats an oxygen concentration detector provided in an exhaust passage of an internal combustion engine, when the engine is started, the method comprising the steps of:

detecting a start and a stop of the engine; and controlling the heater by delivering a control signal to the heater, and wherein the controlling step comprises the steps of:

setting a value of the control signal to a first predetermined value until a first predetermined time period has elapsed after the start of the engine was detected in the detecting step, setting the value of the control signal to a second predetermined value smaller than the first predetermined value until a second predetermined time period has elapsed after the lapse of the first predetermined value, and setting the value of the control signal to a third predetermined value smaller than the second predetermined value after the lapse of the second predetermined time period.

8. A method as claimed in claim 7, wherein the controlling step further comprises the step of:

measuring a time period elapsed after the stop of the engine, and setting the first predetermined time period according to the elapsed time period measured in the step of measuring the stoppage time period at the start of the engine.

9. A method as claimed in claim 7, wherein the controlling step further comprises the steps of:

measuring a time period elapsed after the stop of the engine, measuring a supply time period over which the control signal has been supplied to the heater after the start of the engine, and setting the first predetermined time period at a present start of the engine, according to the supply time period measured in the step of measuring the supply time period during an immediately preceding start of the engine, and the elapsed time period measured in the step of measuring the stoppage time period at the present start of the engine.

* * * * *